(12) United States Patent
Koch et al.

(10) Patent No.: US 6,633,574 B1
(45) Date of Patent: Oct. 14, 2003

(54) DYNAMIC WAIT ACKNOWLEDGE FOR NETWORK PROTOCOL

(75) Inventors: Edward L Koch, San Rafael, CA (US); Jeffrey Warren Scott, San Francisco, CA (US); Thomas Ian Armitage, Tiburon, CA (US)

(73) Assignee: LOYTEC Electronics GmbH, Vienna (AT)

( * ) Notice: Subject to any disclaimer, the term of this patent is extended or adjusted under 35 U.S.C. 154(b) by 321 days.

(21) Appl. No.: 09/271,410

(22) Filed: Mar. 17, 1999

(51) Int. Cl.[7] .......................... H04L 12/28; G01R 31/08
(52) U.S. Cl. ..................... 370/410; 370/389; 370/236
(58) Field of Search ................ 370/231, 235, 370/236, 389, 400, 401, 392, 338, 351, 410, 412, 384, 385, 395.4, 420, 426; 714/748, 749

(56) References Cited

U.S. PATENT DOCUMENTS

| | | | |
|---|---|---|---|
| 4,941,143 A | | 7/1990 | Twitty et al. ............... 370/85.2 |
| 4,947,484 A | | 8/1990 | Twitty et al. ............... 371/37.1 |
| 4,955,018 A | | 9/1990 | Twitty et al. ............... 370/85.1 |
| 4,969,146 A | | 11/1990 | Twitty et al. ............... 370/85.1 |
| 4,969,147 A | | 11/1990 | Markkula, Jr. et al. .... 370/94.1 |
| 4,970,714 A | * | 11/1990 | Chen et al. ................. 714/748 |
| 4,975,904 A | * | 12/1990 | Mann et al. ................ 370/389 |
| 5,297,143 A | * | 3/1994 | Fridrich et al. ............. 370/445 |
| 5,434,860 A | * | 7/1995 | Riddle ......................... 370/84 |
| 5,519,699 A | * | 5/1996 | Ohsawa ......................... 37/60 |
| 5,612,957 A | * | 3/1997 | Gregerson et al. .......... 370/401 |
| 5,854,899 A | * | 12/1998 | Callon et al. .......... 395/200.68 |
| 5,914,936 A | | 6/1999 | Hatono et al. |
| 5,940,371 A | | 8/1999 | Mitts et al. |

* cited by examiner

*Primary Examiner*—Kwang Bin Yao
*Assistant Examiner*—Hanh Nguyen
(74) *Attorney, Agent, or Firm*—Sawyer Law Group LLP

(57) ABSTRACT

The present invention is a method for acknowledgment of receipt of a message in a network, where the network includes a plurality of nodes. The method includes sending a message from a first node of the plurality of nodes destined for a second node of the plurality of nodes; setting a timer for the first node for receipt of an acknowledgment packet from the second node; determining if a wait acknowledge packet is received by the first node; and resetting the timer if the wait acknowledge packet is received by the first node. The present invention adds a wait acknowledge event to the state in the acknowledgment protocol which waits for an acknowledgement packet from the destination node. The wait acknowledge packet notifies the recipient that the message sent by the originating node has been received and forwarded. As long as the message is being properly forwarded to the next hop, wait acknowledge packets will continue to be sent to the originating node. In this manner, the amount of time the originating node waits for the acknowledgment packet from the destination node is dynamic and is dependent upon the actual length of time it takes for the message to be transmitted through the network. This method reduces waste of network resources and minimizes the problem of unintentional duplicate messages.

15 Claims, 6 Drawing Sheets

DYNAMIC WAIT ACKNOWLEDGE FOR NETWORK PROTOCOL

FIELD OF THE INVENTION

The present invention relates to network protocols, and particularly to acknowledgement of receipt of messages in the network protocols.

BACKGROUND OF THE INVENTION

Protocols for control networks, such as the internet, are well known. One such protocol is the protocol developed by ECHELON SYSTEMS CORPORATION. Its protocol is described in U.S. Pat. No. 5,018,138. Applicant hereby incorporates this U.S. Patent by reference.

One of the basic precepts of an internet protocol is the notion of an acknowledgment service. FIG. 1 illustrates a portion of a conventional network. The network 100 comprises a plurality of subnets 102a–102c coupled to a plurality of nodes 104a–104f. Routers 106a–106b are located between subnets 102a–102c. The routers 106a–106b route messages to the appropriate subnet 102a–102c. When an originating node, such as node 104a, sends a message to a destination node, such as node 104f, the message travels from subnet 102a, through router 106a, to subnet 102b, through router 106b, to subnet 102c, and then to destination node 104f. The sequence of routers 106a–106b through which the message travels is the path of the message from the originating node 104a to the destination node 104f.

FIG. 2 is a state diagram illustrating a conventional acknowledgement protocol. Referencing now to FIGS. 1 and 2 together, before a message is sent, an originating node 104a has an idle state 202. When the originating node 104a wishes to send a packet or message, it has a contention state 204. Once the message is sent, the originating node 104a initiates or sets a timer indicated by a state of waiting for an acknowledgment packet 206 from the destination node 104f. The time period of length of the timer is based upon assumptions concerning how long it takes to transport a message through the various elements of the network and to get a message back. This time period is dependent upon the physical media itself and how long it takes for a message to travel along this media. It is advantageous to minimize the time period as an overly long time period wastes valuable network resources. A predetermined amount of time is given for each portion of the route from a subnet to a router, called a "hop". Once destination node 104f receives the message, it sends an acknowledgement packet back to the originating node 104a. If the originating node 104a receives the acknowledgement packet before the timer expires, then it knows that the delivery of the message was successful. The originating node 104a returns to an idle state 202. If the destination node 104f never receives the message due to problems somewhere along the message's path, then the originating node's 104a timer will expire without receiving an acknowledgement packet. In this situation, originating node 104a assumes that the delivery of the message failed. It may then retry message delivery by resending the message. The protocol typically allows for a predetermined number of retries before abandoning the attempt to deliver the message. This protocol is well known in the art and will not be discussed in further detail here.

One problem which exist for this conventional protocol is that the amount of time it take to transport a message through each hop is actually dynamic and variable. The distance in each hop are variable. Some may be very long while others are very short. A message may travel through the routers at different rates, depending on the characteristics of the individual router. When the actual time for a message to be delivered is actually very long, a message may be received by a destination node but its acknowledgement packet may not be able to reach the originating node before the originating node's timer expires. The originating node would be forced to resend the message, wasting valuable network resources.

One effect of this problem is when the originating node retries delivery of the message, the retry message may be mistakenly considered a new message under certain circumstances. For example, although the destination node can detect if duplicate message arrive, if enough time lapses, or new messages are received from other nodes, before the retry message is received, the retry message may be interpreted as a new message by the destination node. This could cause undesirable results. For example, assume that the opening and closing of doors in a water dam is accomplished through a command which toggles the state of the doors. Assume also an operator sends a command to close the water dam doors. However, this message delivery fails. The originating node then retries delivery by resending the message. Due to the problem described above, the second message is mistakenly perceived as a new message. The first message toggles the dam doors closed, while the second message toggles the dam door open again, resulting in the opposite of the desired result. In other applications, the user may receive strange behavior from the network without knowing why, since the problem is difficult, if not impossible, to trace.

Accordingly, what is needed is a method for a dynamic wait acknowledge for a network protocol. The present invention addresses this need.

SUMMARY OF THE INVENTION

The present invention is a method for acknowledgment of receipt of a message in a network, where the network includes a plurality of nodes. The method includes sending a message from a first node of the plurality of nodes destined for a second node of the plurality of nodes; setting a timer for the first node for receipt of an acknowledgment packet from the second node; determining if a wait acknowledge packet is received by the first node; and resetting the timer if the wait acknowledge packet is received by the first node. The present invention adds a wait acknowledge event to the state in the acknowledgment protocol which waits for an acknowledgement packet from the destination node. The wait acknowledge packet notifies the recipient that the message sent by the originating node has been received and forwarded. As long as the message is being properly forwarded to the next hop, wait acknowledge packets will continue to be sent to the originating node. In this manner, the amount of time the originating node waits for the acknowledgment packet from the destination node is dynamic and is dependent upon the actual length of time it takes for the message to be transmitted through the network. This method reduces waste of network resources and minimizes the problem of unintentional duplicate messages.

DETAILED DESCRIPTION

The present invention provides a method and system for a dynamic wait acknowledge for a network protocol. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 3 through 5 in conjunction with the discussion below.

The method of the present invention utilizes an additional event, a wait acknowledge, to the state in the acknowledgment protocol which waits for an acknowledgement packet from the destination node. The wait acknowledge event indicates whether or not a wait acknowledge packet has been received by the originating node. A wait acknowledge packet of the present invention notifies the recipient that the message has been received and sent to the next hop. When the originating node receives a wait acknowledge packet, it resets its timer to further await the acknowledgment packet from the destination node. As long as the message is being properly forwarded to the next hop, wait acknowledge packets will continue to be sent to the originating node. Eventually, the message will reach the destination node, which will return an acknowledgement packet to the originating node. The number of times the timer is reset depends upon the number of hops in the message's path. Thus, the amount of time the originating node waits for the acknowledgment packet is dynamic and is dependent upon the actual length of time it takes for a message to be transmitted to the destination node. With this method of a dynamic wait acknowledge, the problem with unintentional duplicate messages described above is minimized. A shorter length of time may also be used for the timer without compromising reliability, minimizing latency in the network.

Figure 3:
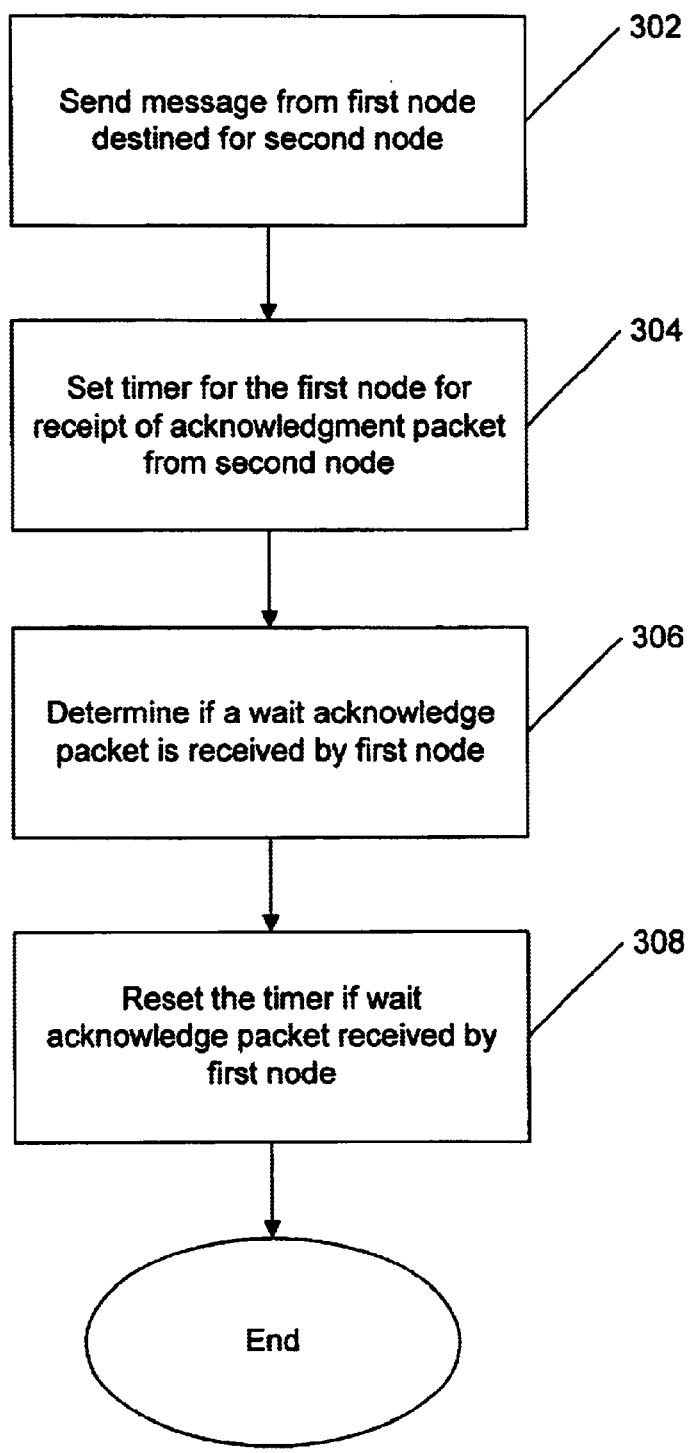
FIG. 3 illustrates a preferred embodiment of a method for providing a dynamic wait acknowledge in accordance with the present invention.

FIG. 3 is a flow chart illustrating a preferred embodiment of the method for a dynamic wait acknowledge in accordance with the present invention. First, a message is sent from a first node destined a second node in the network via step 302. In the preferred embodiment, the first node is the originating node and the second node is the destination node. Next, the first node sets its timer for receipt of an acknowledgment packet from the second node, via step 304. Then, it is determined if a wait acknowledge packet is received by the first node, via step 306. If so, then the timer is reset, via step 308.

Figure 2:
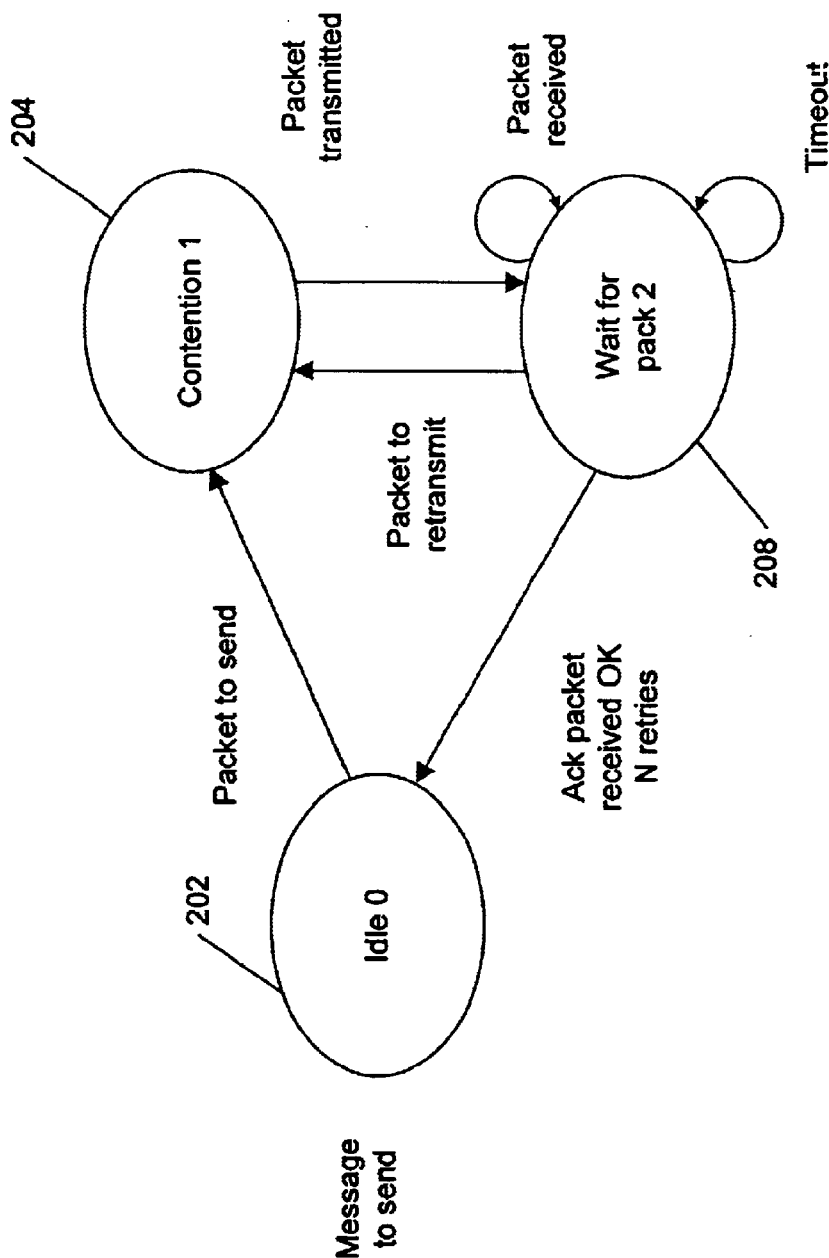
FIG. 2 illustrates a state diagram for a conventional acknowledgment protocol for the network.
Figure 4:
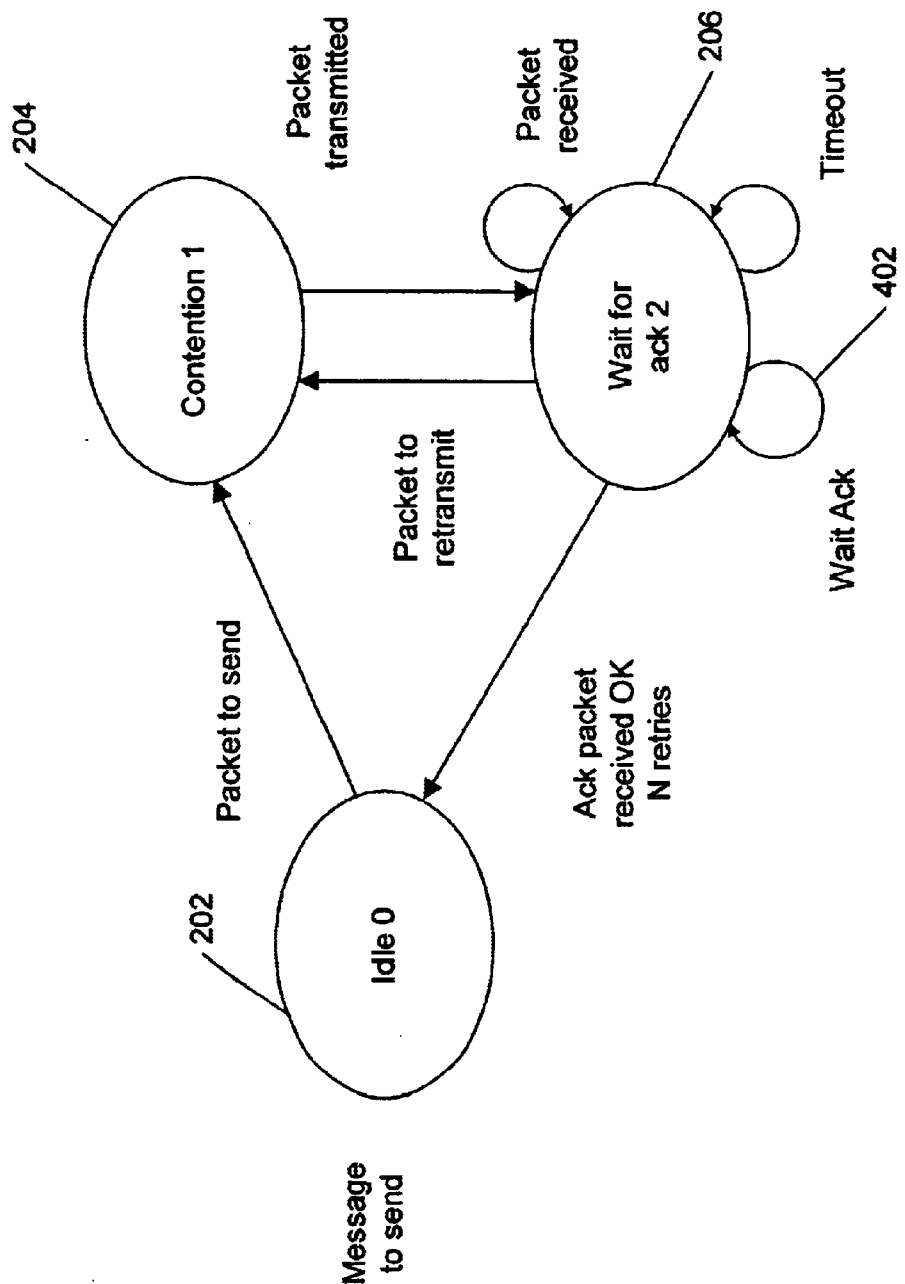
FIG. 4 illustrates a state diagram for a dynamic wait acknowledge protocol in accordance with the present invention.

FIG. 4 is a state diagram of the acknowledgement protocol with the method for a dynamic wait acknowledge in accordance with the present invention. The states are the same as that illustrated in FIG. 2 except for the additional of a wait acknowledge state 402 in accordance with the present invention.

Figure 1:
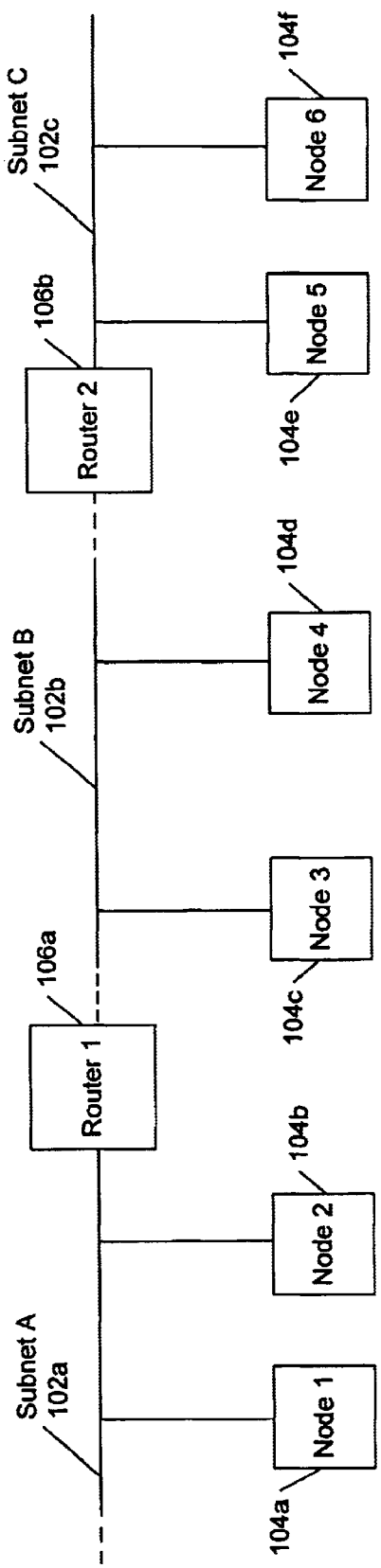
FIG. 1 illustrates a conventional network.

For example, for the network 100 illustrated in FIG. 1, assume that node 104a sends a message destined for node 104f. Thus node 104a is the originating node while node 104f is the destination node. As node 104a sends the message, it sets its timer. The message first travels through subnet 102a to router 106a. When router 106a receives the message, it forwards the message to the next hop and sends a wait acknowledge packet back to node 104a, indicating that it has received and forwarded the message. Assuming node 104a receives the wait acknowledge packet before its timer expires, node 104a then resets it timer. The message travels through subnet 102b to router 106b. When router 106b receives the message, it forwards it to the destination node 104f and sends a wait acknowledge packet back to router 106a, indicating it has received and forwarded the message. When router 106a receives the wait acknowledge packet from router 106b, it sends a wait.acknowledge packet back to node 104a. With receipt of another wait acknowledge packet before its timer expires, node 104a resets its timer again. When node 104f receives the message, it sends an acknowledgment packet back to node 104a.

In this manner, as long as the message is being forwarded to each router in the path to the destination node, wait acknowledge packets will continue to be sent back to the preceding router and eventually to the originating node. The originating node will continue to wait for an acknowledgement packet as long as it keeps receiving wait acknowledge packets. If one of the routers didn't receive a wait acknowledge packet from an upstream router, then it ceases to send wait acknowledged packets to the preceding router. Eventually, the timer at the originating node will time out and the message will be resent according to the conventional protocol. Thus, a dynamic wait acknowledge period is provided by the present invention.

Figure 5:
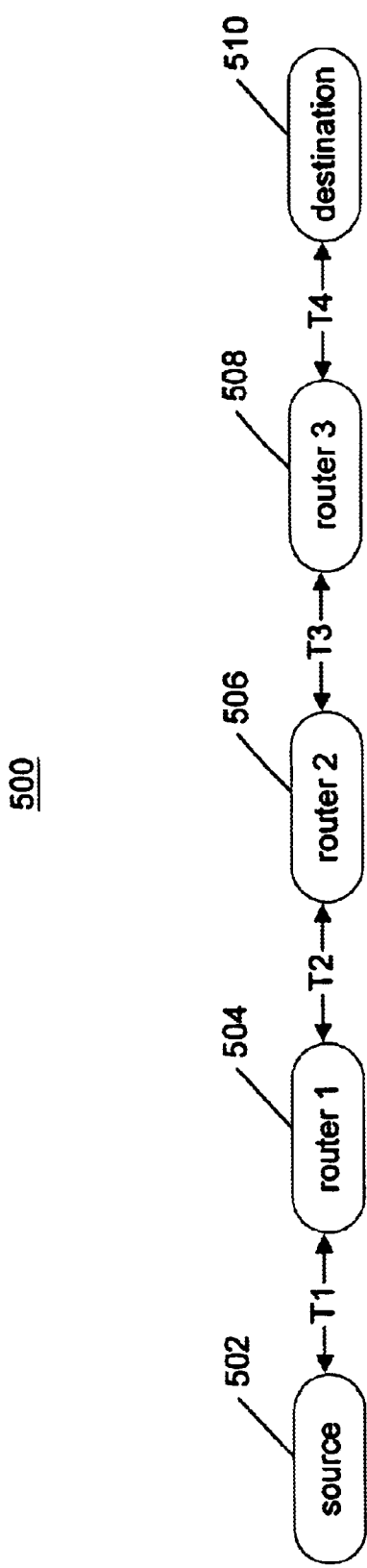
FIG. 5 illustrates an example of the use of the dynamic wait acknowledge in accordance with the present invention.

For example, FIG. 5 illustrates the use of the dynamic wait acknowledge of the present invention. Assume that an acknowledged message is sent from the source node 502 to the destination node 510. Assume also the message is forwarded through the router chain shown. When router 504 receives the packet, it forwards it to the next router 506 and also sends a wait acknowledge message back to the source node 502. When router 506 receives the packet, it forwards it to the next router 508 and also sends a wait acknowledge message back to router 504. Router 504, in receiving the wait acknowledge message from router 506, sends a wait acknowledge message to the source node 502. When router 508 receives the packet, it forwards it to the destination node 510 and sends a wait acknowledge message back to router 506, which sends a wait acknowledge to router 504, which sends its own wait acknowledge to the source node 502. When the destination ode 510 receives the packet, it sends an acknowledgement packet back through the router chain 508, 506, 504 to the source node 502. Assume the approximate time it takes for the wait acknowledge message to traverse through each subnet is shown by T1–T4. Then the approximate time it takes for each response to reach the source node 502 is the following:

Wait Acknowledge from router 504=2T1
Wait Acknowledge from router 506=2T1+2T2
Wait Acknowledge from router 508=2T1+2T2+2T3
Acknowledgement from destination node 510=2T1+2T2+ 2T3+2T4.

Figure 6:
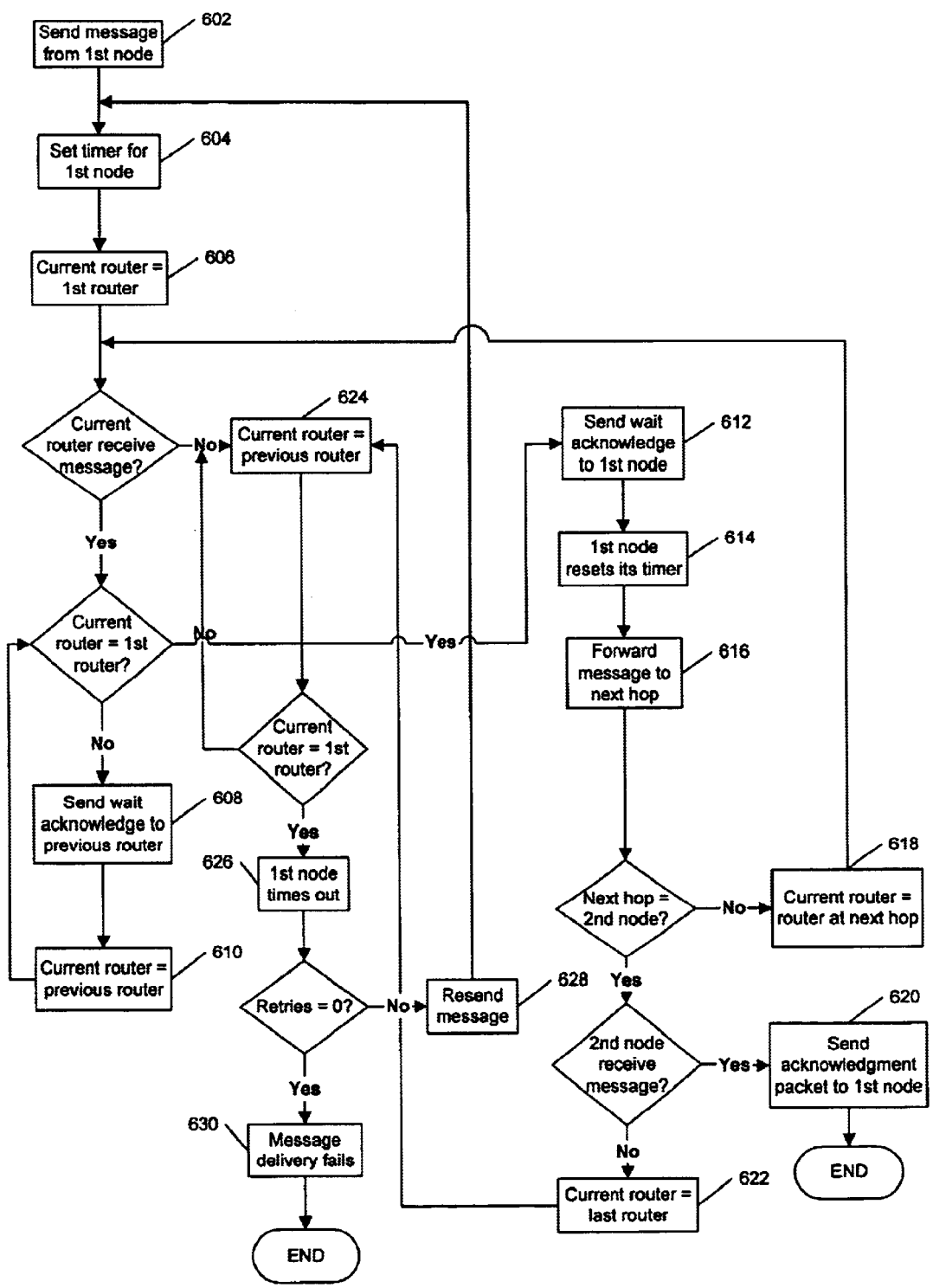
FIG. 6 illustrates in more detail the preferred embodiment of the method for providing a dynamic wait acknowledge in accordance with the present invention.

FIG. 6 is a flow chart illustrating in more detail the preferred embodiment of a method for a dynamic wait acknowledge in accordance with the present invention. First, the first or originating node sends a message destined for the second or destination node, via step 602. Once sent, the first node sets its timer, via step 604. At the beginning of the transfer of the message, the "current router" is the first router in the message's path, via step 606. The "current router," as used in this specification, refers to the router in the message's path which is the current focus of the description of the preferred embodiment of the present invention. If the first router receives the message, then it sends a wait acknowledge packet to the first node, via step 612. The first node, in receiving the wait acknowledge packet, resets its timer, via step 614. The message is forwarded to the next hop, via step 616. If the next hop is not the second node, i.e., the message has not reached its destination, then the current router becomes the router at the next hop, via step 618.

If the new current router receives the message, then it sends a wait acknowledge packet to the previous router, via step 608. The focus turns to the previous router, via step 610, which becomes the current router. Since now the current router is the first router in the message's path, steps 612–616 are repeated.

The above steps 608–616 are repeated until the message reaches the second node or until one of the routers does not receive the message. If the message reaches the second node, then the second node sends an acknowledgment packet back to the first node, via step 620, and message delivery is successful. If not, then the current router is the last router in the message's path, via step 622. The last router will never receive an acknowledgment packet from the second node since it never got the message. Each previous router also will stop receiving wait acknowledge packets so no more are being sent back along the sequence of routers in the message's path. The first node will then time out, via step 626. When the first node times out, it will resend the message, via step 628, if it has not reached the threshold number of retries. The first node then again sets its timer, via step 604. If it has reached the threshold number of retries, then the message delivery is deemed to have failed, via step 630.

Steps 604–630 are also performed when the message is lost before it reaches the last router. When a router does not receive the message, it does not send a wait acknowledge packet to the previous router. This is true for each preceding router. Eventually, the first node will time out, via step 626. Either step 628 or 630 is then performed as described above.

A method and system for a dynamic wait acknowledge for a network protocol has been disclosed. The present invention adds a wait acknowledge event to the state in the acknowledgment protocol which waits for an acknowledgement packet from the destination node. The wait acknowledge packet notifies the recipient that the message sent by the originating node has been received and forwarded to the next hop. As long as the message is being properly forwarded, wait acknowledge packets will continue to be sent to the originating node. In this manner, the amount of time the originating node waits for the acknowledgment packet from the destination node is dynamic and is dependent upon the actual length of time it takes for the message to be transmitted through the network. This method reduces waste of network resources and minimizes the problem of unintentional duplicate messages.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for acknowledgment of receipt of a message in a network, the network including a plurality of nodes, comprising the steps of:
   (a) sending a message from a first node of the plurality of nodes destined for a second node of the plurality of nodes;
   (b) setting a timer for the first node for receipt of an acknowledgment packet from the second node;
   (c) determining if a wait acknowledge packet is received by the first node, wherein the wait acknowledge packet notifies the first node that the message has been sent to a next hop; and
   (d) resetting the timer if the wait acknowledge packet is received by the first node.

2. The method of claim 1, wherein the sending step (a) comprises:
   (a1) sending the message from the first node through a sequence of routers, wherein the sequence of routers comprises a path of the message from the first node to the second node.

3. The method of claim 1, wherein the determining step (c) comprises:
   (c1) determining if a current router of a sequence of routers received the message, wherein the sequence of routers comprises the path of the message from the first node to the second node;
   (c2) sending a wait acknowledge packet from the current router to a preceding router if the current router received the message, wherein the wait knowledge packet notifies the preceding router that the message was received by the current router and sent to the next router in the sequence of routers, wherein the wait acknowledge packet causes each router preceding the current router to send a wait acknowledge packet to its preceding router in the sequence of routers; and
   (c3) sending a wait acknowledge packet to the first node from a first router in the sequence of routers if the current router received the message.

4. The method of claim 1, further comprising:
   (e) determining if the timer has expired if the wait acknowledge packet is not received by the first node;
   (f) determining if a threshold number of retries has been reached if the timer has expired; and
   (g) resending the message from the first node and resetting the timer if the threshold number of retries has not been reached.

5. A system for acknowledgment of receipt of a message in a network, comprising:
   means for sending a message from a first node of a plurality of nodes destined for a second node of the plurality of nodes;
   means for setting a timer for the first node for receipt of an acknowledgment packet from the second node;
   means for determining if a wait acknowledge packet is received by the first node, wherein the wait acknowledge packet notifies the first node that the message has been sent to a next hop; and
   means for resetting the timer if the wait acknowledge packet is received by the first node.

6. The system of claim 5, wherein the sending means comprises:
   means for sending the message from the first node through a sequence of routers, wherein the sequence of routers comprises a path of the message from the first node to the second node.

7. The system of claim 5, wherein the determining means comprises:

means for determining if a current router of a sequence of routers received the message, wherein the sequence of routers comprises the path of the message from the first node to the second node;

means for sending a wait acknowledge packet from the current router to a preceding router if the current router received the message, wherein the wait knowledge packet notifies the preceding router that the message was received by the current router and sent to the next router in the sequence of routers, wherein the wait acknowledge packet causes each router preceding the current router to send a wait acknowledge packet to its preceding router in the sequence of routers; and means for sending a wait acknowledge packet to the first node from a first router in the sequence of routers if the current router received the message.

8. The system of claim 5, further comprising:

means for determining if the timer has expired if the wait acknowledge packet is not received by the first node;

means for determining if a threshold number of retries has been reached if the timer has expired; and means for resending the message and resetting the timer if the threshold number of retries has not been reached.

9. A method for acknowledgment of receipt of a message in a network, the network including a plurality of nodes, comprising the steps of:

(a) sending the message from a first node of the plurality of nodes destined for a second node of the plurality of nodes through a sequence of routers, wherein the sequence of routers comprises the path of the message from the first node to the second node;

(b) setting a timer for the first node for receipt of an acknowledgment packet from the second node;

(c) determining if a current router of the sequence of routers received the message;

(d) sending a wait acknowledge packet from the current router to a preceding router if the current router received the message, wherein the wait knowledge packet notifies the preceding router that the message was received by the current router and sent to the next router in the sequence of routers wherein the wait acknowledge packet causes each router preceding the current router to send a wait acknowledge packet to its preceding router in the sequence of routers;

(e) sending a wait acknowledge packet to the first node from a first router in the sequence of routers if the current router received the message; and (f) resetting the timer if the wait acknowledge packet is received by the first node.

10. The method of claim 9, further comprising:

(g) determining if the timer has expired if the wait acknowledge packet is not received by the first node;

(h) determining if a threshold number of retries has been reached if the timer has expired; and (i) resending the message and resetting the timer if the threshold number of retries has not been reached.

11. A system for acknowledgment of receipt of a message in a network, comprising:

means for sending the message from a first node of the plurality of nodes to a second node of the plurality of nodes through a sequence of routers, wherein the sequence of routers comprises the path of the message from the first node to the second node;

means for setting a timer for the first node for receipt of an acknowledgment packet from the second node;

means for determining if a current router of the sequence of routers received the message;

means for sending a wait acknowledge packet from the current router to a preceding router if the current router received the message, wherein the wait knowledge packet notifies the preceding router that the message was received by the current router and sent to the next router in the sequence of routers, wherein the wait acknowledge packet causes each router preceding the current router to send a wait acknowledge packet to its preceding router in the sequence of routers;

means for sending a wait acknowledge packet to the first node from a first router in the sequence of routers if the current router received the message; and means for resetting the timer if the wait acknowledge packet is received by the first node.

12. The system of claim 11, further comprising:

means for determining if the timer has expired if the wait acknowledge packet is not received by the first node;

means for determining if a threshold number of retries has been reached if the timer has expired; and means for resending the message and resetting the timer if the threshold number of retries has not been reached.

13. A method for acknowledgment of receipt of a message in a network, the network including a plurality of nodes, comprising the steps of:

(a) sending the message from a first node of the plurality of nodes to a second node of the plurality of nodes through a sequence of routers, wherein the sequence of routers comprises the path of the message from the first node to the second node;

(b) setting a timer for the first node for receipt of an acknowledgment packet from the second node;

(c) determining if a current router of the sequence of routers received the message;

(d) sending a wait acknowledge packet from the current router to a preceding router if the current router received the message, wherein the wait knowledge packet notifies the preceding router that the message was received by the current router and sent to the next router in the sequence of routers, wherein the wait acknowledge packet.causes each router preceding the current router to send a wait acknowledge packet to its preceding router in the sequence of routers;

(e) sending a wait acknowledge packet to the first node from a first router in the sequence of routers if the current router received the message;

(f) resetting the timer if the wait acknowledge packet is received by the first node;

(g) determining if the timer has expired if the wait acknowledge packet is not received by the first node;

(h) determining if a threshold number of retries has been reached if the timer has expired; and (i) resending the message and resetting the timer if the threshold number of retries has not been reached.

14. A system for acknowledgment of receipt of a message in a network, comprising:

means for sending the message from a first node of the plurality of nodes to a second node of the plurality of nodes through a sequence of routers, wherein the sequence of routers comprises the path of the message from the first node to the second node;

means for setting a timer for the first node for receipt of an acknowledgment packet from the second node;

means for determining if a current router of the sequence of routers received the message;

means for sending a wait acknowledge packet from the current router to a preceding router if the current router received the message, wherein the wait knowledge packet notifies the preceding router that the message was received by the current router and sent to the next router in the sequence of routers, wherein the wait acknowledge packet causes each router preceding the current router to send a wait acknowledge packet to its preceding router in the sequence of routers;

means for sending a wait acknowledge packet to the first node from a first router in the sequence of routers if the current router received the message;

means for resetting the timer if the wait acknowledge packet is received by the first node;

means for determining if the timer has expired if the wait acknowledge packet is not received by the first node;

means for determining if a threshold number of retries has been reached if the timer has expired; and means for resending the message and resetting the timer if the threshold number of retries has not been reached.

15. A computer readable medium with computer instructions for acknowledgment of receipt of a message in a network, the network including a plurality of nodes, the instructions comprising:

(a) sending a message from a first node of the plurality of nodes to a second node of the plurality of nodes;

(b) setting a timer for the first node for receipt of an acknowledgment packet from the second node;

(c) determining if a wait acknowledge packet is received by the first node, wherein the wait acknowledge packet notifies the first node that the message has been sent to a next hop; and (d) resetting the timer if the wait acknowledge packet is received by the first node.

* * * * *